Sept. 9, 1924.

W. B. POTTER

TEST TIE

Filed June 24, 1920

1,508,249

2 Sheets-Sheet 1

Inventor:
William B. Potter,
by Albert G. Davis
His Attorney.

Sept. 9, 1924.

W. B. POTTER 1,508,249

TEST TIE

Filed June 24, 1920

2 Sheets-Sheet 2

Inventor:
William B. Potter,
by Albert G. Davis
His Attorney.

Patented Sept. 9, 1924.

1,508,249

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

TEST TIE.

Application filed June 24, 1920. Serial No. 391,461.

*To all whom it may concern:*

Be it known that I, WILLIAM B. POTTER, a citizen of the United States, residing at Schenectady, in the county of Schenectady, State of New York, have invented certain new and useful Improvements in Test Ties, of which the following is a specification.

My invention relates to a novel test tie, used for indicating or recording the horizontal and vertical pressures on a rail. More particularly my invention comprises a device whereby it is possible to record the loads acting on a rail as the locomotive or the train of cars drawn thereby roll over the rail to be tested.

It is very often of considerable utility to a designer of a locomotive to find out what the values are of the stresses imposed upon the rail due to the passing of a locomotive thereover. The weight of the locomotive itself causes a bending stress on the rail. When going around curves there is a so-called flange pressure on the head of the rail produced by the thrust of the flange against the side of the head. It is the purpose of my invention to determine expeditiously what these stresses are which tend to deflect the rail both vertically and horizontally.

Broadly considered my invention comprises the employment of flexible members which are adapted to be deflected in response to rail deflections as the wheels of a rolling truck exert their pressures upon the rail. The deflections of these members are utilized for indicating or recording the extent of these deflections which may be made a measurement of the forces borne by the rail. I find it most convenient to utilize relatively long and stiff steel springs which are supported at their ends and deflected at about their middle portions in response to the load on the rail. Bearing against these middle portions, in order to be responsive to these deflections, is some form of recording element which translates this motion into the movement of a stylus over a recording sheet appropriately positioned.

Figures 1, 3:
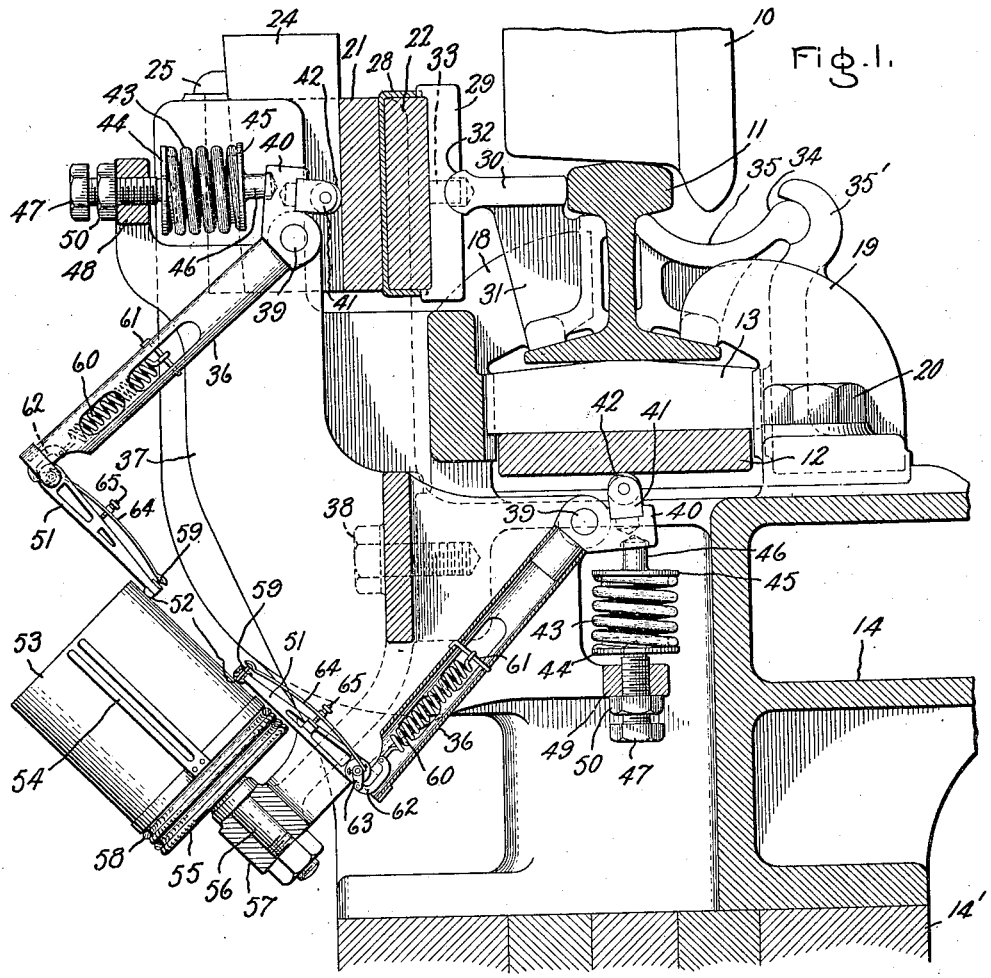
Figure 2:
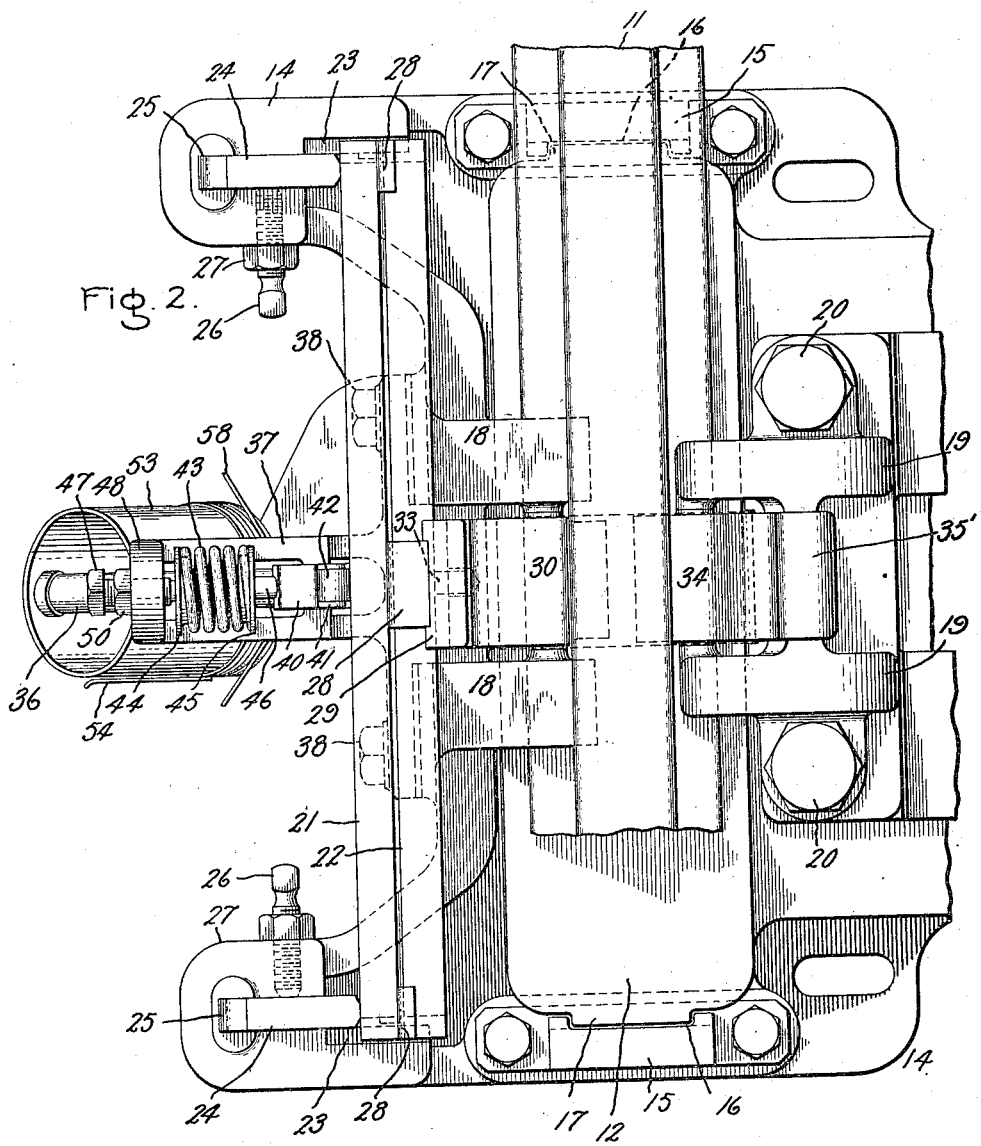
Figure 4:
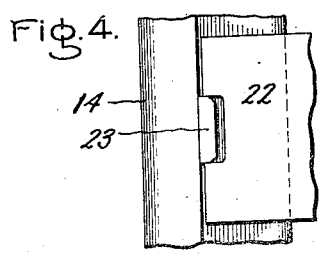

The construction and mode of operation of my invention will be made apparent by reference to the accompanying specification and drawings in which Fig. 1 is a transverse section through the rail and the operating parts of my recorder; Fig. 2 is a plan view of the rail and the parts making up my recorder; Fig. 3 is a fragmentary sectional view showing how the flat spring is supported which serves to record the vertical deflections of the rail; and Fig. 4 is a fragmentary view showing how the other of the resilient members, made use of in my device, is supported.

Referring now more in detail to the drawings in which like reference characters refer to like parts throughout, the wheel 10 of a car or locomotive is shown as passing over the rail 11 supported upon a resilient member or spring 12. In the present instance there is no direct mechanical contact between the rail 11 and the spring 12 since there is interposed therebetween a block 13 of the shape clearly shown in Fig. 1. This block is placed at or near the middle portion of the spring 12 which is supported at its ends, in a manner to be described later, on the supporting frame 14 which is appropriately constructed so as to serve as a support for all of the operative portions of the invention. The frame 14 is appropriately supported on the ground as shown in Fig. 1, where the numeral 14' designates either the ground itself or a coping of concrete or wood. The frame 14 is of such a character that it extends beneath both of the rails and a recording apparatus may be installed at the other side of said frame, similar to that shown in the present instance, so that the pressure on both of the rails may be measured at this point.

In order to support the flat spring 12 and still allow it to have freedom of motion in a vertical direction so as to be responsive to the loads carried by the rail 11, I provide guides 15 bolted or otherwise appropriately secured to the frame 14, and having vertical grooves 16 therein which accommodate the ends 17 of the spring 12. As shown in Fig. 2, the ends 17 are appropriately formed so that they may be readily fitted into the grooves 16, and there is sufficient clearance at this point so that a relatively free motion of the spring 12 is obtained. The guides 15 also serve as limit stops for the rail in case the spring 12 should be removed or out of commission for any reason. To maintain the rail in position projections or lugs 18 and 19 are provided which serve to hold the rail 11 firmly against the block 13. The lug 18 also has a vertical surface placed near the web of the rail to serve as a limit stop to the sidewise movement. For the purpose of ease in assembling, the lugs 19 are in this case shown as made separate from the frame 14 so that they may be bolted on after the rail is in position. For this purpose I use the bolts 20. It is evident that, as described, a vertical deflection of the spring 12 is obtained whenever a heavy object rolls over this rail.

For the measurement of the sidewise pressures or stresses upon the rail I appropriately support a flexible member, in this case shown as a pair of flat springs 21 and 22, at their extremities on the frame 14. In order to provide a proper support for this flexible member I have shown a pair of lugs 23 located respectively at the edges of the frame 14, and engaging appropriately shaped grooves in the springs 21 and 22, as clearly shown in Fig. 4. For the purpose of supplying a proper abutment piece for this resilient member I provide wedges 24 held in place by the keys 25. Both the wedges 24 and the keys 25 are held in narrow grooves in the frame 14, as clearly shown in Fig. 2. There may also be provided, if necessary, set screws 26 and check nuts 27 for assuring that the wedges 24 will be maintained in their proper positions. The flexible member comprising the springs 21 and 22 is so arranged that at or near its middle portion it is adapted to be acted upon by the sidewise deflection of the rail 11. The springs 21 and 22 are separated by thin spacers 28 so as to allow free movement of each of them independently of the other. To transmit the thrust from the rail 11 I provide means such as a grooved block 29 engaging the middle portion of the spring 22. A further element for transmitting the thrust comprises the member 30 which serves as a strut between the block 29 and the side of the head of the rail 11. This strut 30 is shown as a portion of a casting 31 which serves also to brace the rail. The strut 30 has a cylindrical surface 32 engaging in the similarly shaped groove of the block 29. The strut 30 is active, as may readily be seen by inspection to transmit a thrust at approximately the mid point of the spring 22. A pin 33 is provided in the block 29 which serves to prevent misalignment between the member 30 and this block. The other side of the rail 11 is braced by a casting 34 which has a dip 35 to permit the flange of the wheel to go by with sufficient clearance. This casting 34 is held in place by the lug 35' carried by the frame 14.

I provide appropriate indicating means for recording the movement of the vertical and horizontal movements of the rail 11 and thus the forces imposed thereon. For this purpose I have shown a pair of pivoted arms 36, respectively co-acting with the springs 12 and 21. These arms are appropriately carried by a frame member or support 37 fastened to the main frame 14 in any appropriate fashion, such as by means of the bolts 38. These arms 36 may be made of tubular material and are pivoted on pins 39 held in the frame 37. Each of the arms 36 has a relatively short member or head casting 40 which supports a clevis 41 carrying a contact roller 42. These rollers 42 engage the middle portions of the springs 12 and 21. It is evident that when these springs are deflected the pivoted arms 36 are rotated about their pivots 39 in response thereto. This rotation is made use of for producing the record on the record sheet. To keep the rollers 42 in contact with their respective springs I provide appropriate pressure means, such as the compression springs 43, acting between two spring supports 44 and 45. The spring supports 45 have projections 46 which enter into apertures in the members 40 to produce a thrust upon the rollers 42. The other spring supports 44 are engaged by bolts 47 which also engage tapped holes in lugs 48 and 49 shown in the present instance as integral with the support 37. Check nuts 50 are also provided for insuring the maintenance of the adjustment of the springs 43.

The pivoted arms 36 carry at their extremities the recording arms 51 which are pivoted in the hollow tube like portion of the arm 36. These arm 51 carry by their extremities appropriate recording styli 52 which cooperate with properly prepared recording sheet 53, held by spring clips 54 on a rotating recording drum 55. This drum is supported on a spindle 56 clamped to a boss 57 carried on the support 37. In order to record a plurality of deflections, it is necessary to move the sheet 53 so that the records thereon may be traced on separate portions of the sheet. For this purpose I provide a wire 58 which is wound about the drum 55 and which may be pulled to rotate the drum. This rotation may be, and usually is, continuous so that the abscissae of the curve obtained may represent a convenient variable, such as time, or length of the train passing. In this way a plurality of peaks corresponding to a plurality of wheels passing over the rail, may be recorded in regular sequence on the record sheet.

It is evident that the particular means I illustrate for producing the mark on the record sheet is but one of a great many varieties of apparatus which may accomplish the same result. In this instance I illustrate a recording means which is described and claimed in an application filed concurrently herewith entitled Recorder, for Fred B. Howell, Serial No. 391,494, and assigned to the same assignee as the present application. In general the method for producing a record comprises covering the paper 53 with a metallic coating, which coacts with a soft metal pin 59 slidably carried in the extremity of the recording arm 51. The recording arm 51 is urged against the surface of the record sheet 53 by the use of a tension spring 60, one end of which is fastened to a pin 61 inserted through the hollow portion of the pivoted arm 36. The other extremity of this spring 60 is connected pivotally to a short link 62 which in turn is pivoted to the crank arm 63, rigidly fastened to the recording arm 51. The pressure exerted by spring 60 is made sufficiently large so that even though the stresses are applied to the rail in a very sudden manner said recording arm 51 does not leave the surface of the record sheet 53. The contact portion of the arm 51 is made of a hard smooth material so it may readily move over the surface of the record sheet. In order to exert just the right tension upon the pins 59 I have shown a flat spring 64, the tension of which is adapted to be adjusted by means of a screw and nut arrangement 65. This particular arrangement for obtaining the record is not my invention, and I have merely illustrated it as one of a large number of schemes that may be utilized.

The mode of operation of the device is thought to be apparent. When it is desired to obtain a record as locomotive or a car passes over the rail the drum is set into rotation by appropriate manipulation of the operating wire 58. The rotation is preferably maintained uniform and at some point during its rotation the wheels pass over the rail and the pivoted arms 36 are rotated slightly due to the deflections of the springs 12, 21 and 22. This has the effect of causing a transverse movement of the recording arm 51 with respect to the recording sheet 53. The amounts of these transverse movements serve for indicating the forces exerted upon the rail, and by proper calibration it is possible to have the direct reading in pounds or tons.

While I have shown in the accompanying specification the preferred embodiment of my invention I do not desire to be limited thereto, but aim to embrace in the appended claims all modifications falling fairly within the scope of my invention.

What I claim as new and desire to secure by Letters Patent of the United States, is:—

1. In an instrument for measuring the forces upon rails, a resilient support for the rail arranged to be deflected in response to loads on the rail, a resilient member arranged to be deflected in response to sidewise forces on the rail, a pair of indicating means operated respectively by the deflections of said resilient members, and means for simultaneously recording the deflections of said indicating means on a common record sheet.

2. In an instrument adapted for measuring the forces upon rails caused by a load moving thereon, a resilient support for the rail arranged to be deflected at its middle portion in response to loads on the rail, a pivoted arm moved directly by the deflection of said support, and an indicator carried by said arm.

3. In an instrument adapted for measuring the forces upon rails caused by a load moving thereon, a resilient member arranged to be deflected at its middle portion in response to sidewise forces on the rail, a pivoted arm rotated directly by the deflection of said member, and an indicator carried by said arm.

4. In an instrument for measuring the forces upon rails, a resilient support for the rail arranged to be deflected at its middle portion in response to loads on the rail, a pivoted arm oscillated by the deflection of said support, an indicator carried by said arm, a resilient member arranged to be deflected at its middle portion in response to sidewise forces on the rail, a pivoted arm oscillated by the deflection of said member, and an indicator carried by said arm.

5. In an instrument for measuring the forces upon rails, a resilient support for the rail arranged to be deflected in response to loads on the rail, a resilient member arranged to be deflected in response to sidewise forces on the rail, a pair of recording styli operated respectively by the deflections of said resilient members, a rotatable drum and a record sheet carried by said drum cooperating with said styli.

6. In an instrument for measuring the forces upon rails, a frame embracing the rail, a flat spring supported at its ends on said frame, a block placed near the middle portion of said spring upon which the rail rests, whereby said middle portion is deflected in response to the load on the rail, a pivoted arm, a roller carried by one end of said arm contacting with the middle portion of said spring, a stylus carried by the arm, and a relatively movable record sheet cooperating with said stylus.

7. In an instrument for measuring the forces upon rails, a frame embracing the rail, a flat spring supported at its ends on said frame, a block placed near the middle portion of said spring, a member interposed between the said block and the side of the rail head, whereby said middle portion is deflected in response to the sidewise forces on the rail, a pivoted arm, a roller carried by one end of said arm contacting with the middle portion of said spring, a stylus carried by the arm, and a relatively movable record sheet cooperating with said stylus.

8. In an instrument for measuring the forces upon rails, a resilient support for the rail arranged to be deflected in response to loads on the rail, a resilient member arranged to be deflected in response to sidewise forces on the rail, a pair of pivoted arms operated respectively by the deflections of said resilient members, styli carried by said arms, a rotatable drum, a record sheet carried thereby, and means for keeping the styli in contact with said record sheet.

9. In an instrument for measuring the forces upon rails, a frame embracing the rail, a flat spring supported at its ends on said frame, a block placed near the middle portion of said spring upon which the rail rests, whereby said middle portion is deflected in response to the load on the rail, a second flat spring supported at its ends on said frame, a block placed near the middle portion of said spring, a member interposed between said block and the side of the rail head, whereby said middle portion is deflected in response to the sidewise forces on the rail, a pair of pivoted arms each carrying a roller contacting respectively with the middle portion of each spring, styli pivotally carried by said arms, a rotatable drum, a record sheet carried thereby, and adjustable springs for keeping the styli in contact with said record sheet as it rotates.

In witness whereof, I have hereunto set my hand this 22nd day of June, 1920.

WILLIAM B. POTTER.